(12) United States Patent
Funamoto (10) Patent No.: US 7,847,855 B2
(45) Date of Patent: Dec. 7, 2010

(54) IMAGE CAPTURING APPARATUS AND FOCUSING METHOD WITH FOCUS EVALUATION

(75) Inventor: Kenji Funamoto, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 387 days.

(21) Appl. No.: 11/964,473

(22) Filed: Dec. 26, 2007

(65) Prior Publication Data

US 2008/0158407 A1 Jul. 3, 2008

(30) Foreign Application Priority Data

Dec. 27, 2006 (JP) ............................. 2006-353204

(51) Int. Cl.
G03B 13/00 (2006.01)
H04N 5/222 (2006.01)
(52) U.S. Cl. ................................ 348/349; 348/333.03
(58) Field of Classification Search ................ 348/169, 348/170, 348, 349, 350
See application file for complete search history.

(56) References Cited

U.S. PATENT DOCUMENTS

| 2003/0086134 | A1 | 5/2003 | Enomoto |
| 2005/0179780 | A1 | 8/2005 | Kikkawa et al. |
| 2005/0231628 | A1 | 10/2005 | Kawaguchi et al. |
| 2006/0012702 | A1* | 1/2006 | Kawahara et al. ........... 348/345 |
| 2006/0028576 | A1* | 2/2006 | Ito ............................. 348/345 |

(Continued)

FOREIGN PATENT DOCUMENTS

JP 09-101579 A 4/1997

(Continued)

OTHER PUBLICATIONS

Explanation of circumstances concerning accelerated examination, dated Sep. 14, 2010, of record in corresponding JP Application No. 2006-353204, 12 pages English and Japanese.

*Primary Examiner*—Ngoc-Yen T Vu
(74) *Attorney, Agent, or Firm*—Sughrue Mion, PLLC (57) ABSTRACT

The image capturing apparatus includes: a taking optical system which includes a focusing lens; an imaging unit which receives a subject light through the taking optical system and converts the subject light to image data representing frame images; a face detection unit which detects a face region of a person in a first frame image that is one of the frame images sequentially supplied by the imaging unit; a face detection setting unit which sets, for the face detection unit, a position and a size of a face region detection area in a second frame image supplied after the first frame image by the imaging unit, in accordance with a position and a size of the face region detected by the face detection unit in the first frame image; a focus region defining unit which defines, in accordance with a position and a size of the face region detected by the face detection unit in the second frame image, a focus evaluation value calculation region in a third frame image supplied after the second frame image by the imaging unit; a calculation unit which calculates a focus evaluation value in accordance with the image data in the focus evaluation value calculation region defined by the focus region defining unit in the third frame image; and a focus adjustment unit which adjusts a focus of the focusing lens in accordance with the focus evaluation value calculated by the calculation unit.

2 Claims, 6 Drawing Sheets

U.S. PATENT DOCUMENTS

| | | | |
|---|---|---|---|
| 2007/0030381 A1* | 2/2007 | Maeda | 348/345 |
| 2007/0064145 A1* | 3/2007 | Sugimoto | 348/345 |

FOREIGN PATENT DOCUMENTS

| | | |
|---|---|---|
| JP | 2002-199221 A | 7/2002 |
| JP | 2003-209683 A | 7/2003 |
| JP | 2005-215750 A | 8/2005 |
| JP | 2005-318554 A | 11/2005 |
| JP | 2006-025238 A | 1/2006 |
| JP | 2006-174022 A | 6/2006 |
| JP | 2007-074394 A | 3/2007 |
| JP | 2008-035167 A | 2/2008 |
| JP | 2008-089811 A | 4/2008 |

* cited by examiner

IMAGE CAPTURING APPARATUS AND FOCUSING METHOD WITH FOCUS EVALUATION

BACKGROUND OF THE INVENTION

1. Field of the Invention

The present invention relates to focusing of an image capturing apparatus.

2. Description of the Related Art

Japanese Patent Application Publication No. 2005-318554 discloses that an image used for face detection is utilized for performing control such as AE/AF/AWB in a camera so as to improve focusing accuracy in a case where the subject is moving or the camera is shaking.

Japanese Patent Application Publication No. 2006-025238 discloses that the size of a person's face is determined in accordance with an estimated distance to the subject being focused, and face detection is performed with the determined size so that a face detection time is shortened.

Japanese Patent Application Publication No. 2005-215750 discloses that a face detection region is defined in accordance with image data and associated information, and face detection processing is partially executed on the face detection region.

Techniques for performing face detection and automatic focus (AF) adjustment in the detected face region are well known. However, in the related art, it takes a long time to perform face detection and to then search for a focus position in contrast AF. Hence, when performing AF in a face region having been detected, it is difficult to accurately focus on the face in a case where the subject is moving or the camera is shaking.

SUMMARY OF THE INVENTION

The present invention has been contrived in view of the foregoing circumstances, and the object is to provide a technology for accurately focusing on a face in spite of subject movement, camera shake, and the like.

In order to attain the aforementioned object, the present invention is directed to an image capturing apparatus, comprising: a taking optical system which includes a focusing lens; an imaging unit which receives a subject light through the taking optical system and converts the subject light to image data representing frame images; a face detection unit which detects a face region of a person in a first frame image that is one of the frame images sequentially supplied by the imaging unit; a face detection setting unit which sets, for the face detection unit, a position and a size of a face region detection area in a second frame image supplied after the first frame image by the imaging unit, in accordance with a position and a size of the face region detected by the face detection unit in the first frame image; a focus region defining unit which defines, in accordance with a position and a size of the face region detected by the face detection unit in the second frame image, a focus evaluation value calculation region in a third frame image supplied after the second frame image by the imaging unit; a calculation unit which calculates a focus evaluation value in accordance with the image data in the focus evaluation value calculation region defined by the focus region defining unit in the third frame image; and a focus adjustment unit which adjusts a focus of the focusing lens in accordance with the focus evaluation value calculated by the calculation unit.

According to this aspect of the present invention, the time required for face detection is remarkably reduced by limiting, in accordance with the position and size of the face region detected in the first frame image, the position and size of the face region to be detected in the subsequent second frame image. The influence of subject movement and camera shake between face detection and focus evaluation value calculation is then suppressed, and the accuracy of the focus on the face can be thus improved.

The present invention is also directed to an image capturing apparatus, comprising: a taking optical system which includes a focusing lens; an imaging unit which receives a subject light through the taking optical system and converts the subject light to image data representing frame images; a temporary storage unit which temporarily stores the frame images sequentially supplied by the imaging unit; a face detection unit which detects a face region of a person in a first frame image that is one of the frame images stored in the temporary storage unit; a face detection setting unit which sets, for the face detection unit, a position and a size of a face region detection area in a second frame image stored after the first frame image in the temporary storage unit, in accordance with a position and a size of the face region detected by the face detection unit in the first frame image; a focus region defining unit which defines a focus evaluation value calculation region in the second frame image in accordance with a position and a size of the face region detected by the face detection unit in the second frame image; a calculation unit which calculates a focus evaluation value in accordance with the image data in the focus evaluation value calculation region defined by the focus region defining unit in the second frame image; and a focus adjustment unit which adjusts a focus of the focusing lens in accordance with the focus evaluation value calculated by the calculation unit.

According to this aspect of the present invention, the frame image for detecting the face region and the frame image for defining the focus evaluation value calculation region are the same (the second frame image). The target region for calculating the focus evaluation value can thereby be made to match the detected face region, allowing accurate focus adjustment with respect to the face.

Moreover, this aspect of the present invention allows a large reduction in the time required for face detection by limiting, in accordance with the position and size of the face region detected in the first frame image, the position and size of the face region to be detected in the subsequent second frame image, and thereby allows fast and accurate focal adjustment.

The present invention is also directed to an image capturing apparatus, comprising: a taking optical system which includes a focusing lens; an imaging unit which receives a subject light through the taking optical system and converts the subject light to image data representing frame images; a temporary storage unit which temporarily stores the frame images sequentially supplied by the imaging unit; a face detection frame image supply source selecting unit which selects one of the temporary storage unit and the imaging unit as a face detection frame image supply source to supply the frame images for performing face detection; a face detection unit which detects a face region of a person in a first frame image supplied by the face detection frame image supply source; a face detection setting unit which sets a detection range and size of a face region in a second frame image supplied after the first frame image, in accordance with a position of the face region detected by the face detection unit in the first frame image; a focus frame image supply source selecting unit which selects one of the temporary storage unit and the imaging unit as a focus frame image supply source to supply the frame images for defining a focus evaluation value calculation region; a control unit which compares a position and a size of the face region detected by the face detection unit in the first frame image with a position and a size of the face region detected by the face detection unit in the second frame image, judges whether an amount of change in the positions and the sizes of the face regions is less than a predetermined threshold, and causes the face detection frame image supply source selecting unit and the focus frame image supply source selecting unit to select the imaging unit as the face detection frame image supply source and the focus frame image supply source when judging that the amount of change is less than the predetermined threshold and to select the temporary storage unit as the face detection frame image supply source and the focus frame image supply source when judging that the amount of change is not less than the predetermined threshold; a focus region defining unit which defines, in accordance with a position and a size of the face region detected by the face detecting unit in the second frame image, the focus evaluation value calculation region in a third frame image supplied by the focus frame image supply source; a calculation unit which calculates a focus evaluation value in accordance with the image data in the focus evaluation value calculation region defined by the focus region defining unit in the third frame image; and a focus adjustment unit which adjusts a focus of the focusing lens in accordance with the focus evaluation value calculated by the calculation unit.

According to this aspect of the present invention, a decision about whether to perform face detection using the frame images from the imaging unit or the frame images from the temporary storage unit is made depending on the amount of change in the positions and sizes of the face regions. In other words, if the amount of change in the face regions is large, the accuracy of the face detection can be secured through use of the frame images from the temporary storage unit. On the other hand, if amount of change in the face regions is small, the face detection is performed using the frame images from the imaging unit rather than the frame images from the temporary storage unit. This allows the maximum accurate face detection with reduced power consumption.

The present invention is also directed to a focusing method of an image capturing apparatus comprising a taking optical system which includes a focusing lens, an imaging unit which receives a subject light through the taking optical system and converts the subject light to image data representing frame images, the method comprising the steps of: detecting a face region of a person in a first frame image that is one of the frame images sequentially supplied by the imaging unit; setting a position and a size of a face region detection area in a second frame image supplied after the first frame image by the imaging unit, in accordance with a position and a size of the face region detected in the first frame image; defining a focus evaluation value calculation region in a third frame image supplied after the second frame image by the imaging unit, in accordance with a position and a size of the face region detected in the second frame image; calculating a focus evaluation value in accordance with the image data in the focus evaluation value calculation region defined in the third frame image; and adjusting a focus of the focusing lens in accordance with the calculated focus evaluation value.

The present invention is also directed to a focusing method of an image capturing apparatus comprising a taking optical system which includes a focusing lens, an imaging unit which receives a subject light through the taking optical system and converts the subject light to image data representing frame images, the method comprising the steps of: temporarily storing the frame images sequentially supplied by the imaging unit; detecting a face region of a person in a first frame image that is one of the stored frame images; setting a position and a size of a face region detection area in a second frame image stored after the first frame image, in accordance with a position and a size of the face region detected in the first frame image; defining a focus evaluation value calculation region in the second frame image in accordance with a position and a size of the face region detected in the second frame image; calculating a focus evaluation value in accordance with the image data in the focus evaluation value calculation region defined in the second frame image; and adjusting a focus of the focusing lens in accordance with the calculated focus evaluation value.

The present invention is also directed to a focusing method of an image capturing apparatus comprising a taking optical system which includes a focusing lens, an imaging unit which receives a subject light through the taking optical system and converts the subject light to image data representing frame images, the method comprising the steps of: storing the frame images sequentially supplied by the imaging unit in a temporary storage unit; selecting one of the temporary storage unit and the imaging unit as a face detection frame image supply source to supply the frame images for performing face detection; detecting a face region of a person in a first frame image supplied by the face detection frame image supply source; setting a position and a size of a face region detection area in a second frame image supplied after the first frame image, in accordance with a position of the face region detected in the first frame image; selecting one of the temporary storage unit and the imaging unit as a focus frame image supply source to supply the frame images for defining a focus evaluation value calculation region; comparing a position and a size of the face region detected in the first frame image with a position and a size of the face region detected in the second frame image, judging whether an amount of change in the positions and the sizes of the face regions is less than a predetermined threshold, selecting the imaging unit as the face detection frame image supply source and the focus frame image supply source when judging that the amount of change is less than the predetermined threshold, and selecting the temporary storage unit as the face detection frame image supply source and the focus frame image supply source when judging that the amount of change is not less than the predetermined threshold; defining, in accordance with a position and a size of the face region detected in the second frame image, the focus evaluation value calculation region in a third frame image supplied by the focus frame image supply source; calculating a focus evaluation value in accordance with the image data in the focus evaluation value calculation region defined in the third frame image; and adjusting a focus of the focusing lens in accordance with the calculated focus evaluation value.

The present invention allows a large reduction in the time required for face detection by limiting, in accordance with the position and size of the face region detected in the first frame image, the position and size of the face region to be detected in the subsequent second frame image, and it is thereby possible to improve the accuracy of the focus on the face.

According to the present invention, it is possible that the frame images for detecting the face region and the frame images for defining the focus evaluation value calculation region are the same (the second frame image). Hence, the target region for calculating the focus evaluation value can be made to match the detected face region, allowing accurate focus adjustment with respect to the face. Moreover, this invention allows a large reduction in the time required for face detection by limiting, in accordance with the position and size of the face region detected in the first frame image, the position and size of the face region to be detected in the subsequent second frame image, and thereby allows fast and accurate focal adjustment.

According to the present invention, a decision about whether to perform face detection using the frame images from the imaging unit or the frame images from the temporary storage unit is made depending on the amount of change in the positions and sizes of the face regions. In other words, if the amount of change in the face regions is large, the accuracy of the face detection can be secured through use of the frame images from the temporary storage unit. On the other hand, if amount of change in the face regions is small, the face detection is performed using the frame images from the imaging unit rather than the frame images from the temporary storage unit. This allows the maximum accurate face detection with reduced power consumption.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
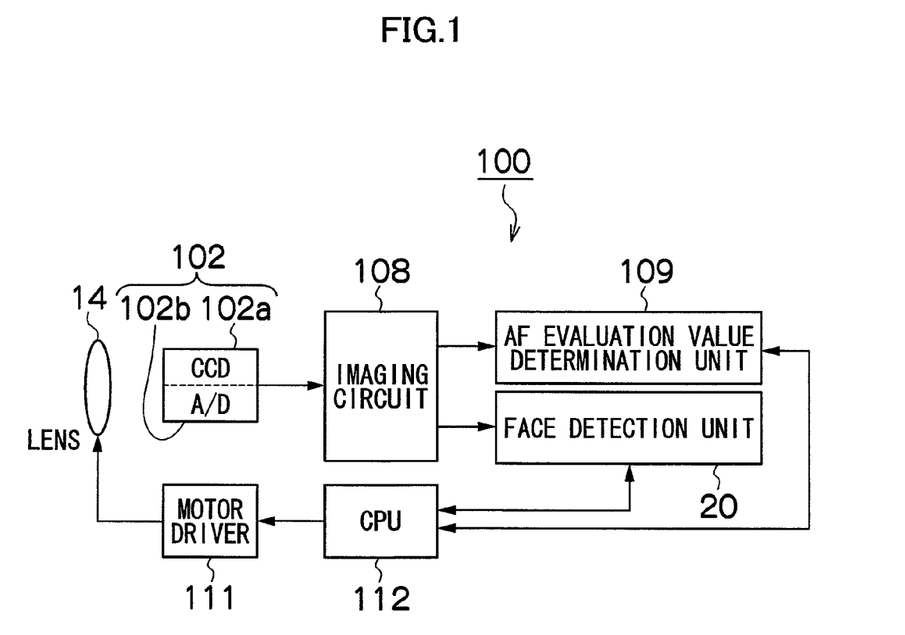
FIG. 1 is a block diagram of a camera according to a first embodiment of the present invention.

FIG. 1 is a main block diagram of a digital camera 100 according to a first embodiment of the present invention. In the digital camera 100 of FIG. 1, a central processing unit (CPU) 112 controls all circuits in the digital camera 100 in accordance with instructions entered through various buttons and keys including a release switch and a mode dial.

The digital camera 100 has an analog front end (AFE) circuit 102, which is composed of a charge-coupled device (CCD) 102a and an analog-digital (A/D) converter 102b. The CCD 102a receives subject light through a taking lens 14, which includes a focus lens and a zoom lens, and converts the received light to analog image signals, and the A/D converter 102b performs correlated double sampling (CDS) processing, gain processing, and the like on the analog image signals outputted from the CCD 102a, and then performs A/D conversion of the analog signals to digital RGB (red, green and blue) image data.

When the user sets a still-image capturing mode with the mode dial or the like, the CPU 112 causes a display unit to display moving images (through-images) thereby allowing the user to determine the imaging angle of view. More specifically, the subject light passing through the taking lens 14 is incident on the CCD 102a. The CCD 102a includes photosensors two-dimensionally arranged on a light receiving surface thereof, and the subject image formed in an effective pixel region of the light receiving surface is converted by the photosensors to signal charges corresponding to the amount of incident light. The signal charges are accumulated and sequentially read as voltage signals (image signals) dependent on the signal charges in accordance with pulse signals applied from a driver circuit (not shown), and the image signals are sent to the A/D converter 102b.

The A/D converter 102b converts the image signals to digital image data, and outputs the digitized image data to an imaging circuit 108.

The imaging circuit 108 is an image processing unit including a white balance correction unit, a gamma correction unit, a YC processing circuit, a brightness and color difference signal generating circuit, a sharpness correction circuit, a contrast correction circuit, an outline processing unit for performing image processing including outline correction on the captured image, and a noise reduction processing unit for performing noise reduction processing of the image. The imaging circuit 108 processes the image data in accordance with commands from the CPU 112.

The image data outputted from the imaging circuit 108 is converted to a brightness signal (Y signal) and a color difference signal (Cr, Cl signal), which are subjected to predetermined processing such as gamma correction, and then stored in a VRAM (not shown).

The face detection unit 20 detects a face region, which is a region containing the face parts of a person, from the digital image data (representing the through-images) sequentially outputted from the imaging circuit 108. Techniques available for detecting the face region include one disclosed in Japanese Patent Application Publication No. 09-101579, of which the applicant is the assignee of the present U.S. application.

This technique involves judging whether the hue of each pixel in the captured image is included in a range of skin pigmentation or not, so as to divide the image into skin pigmentation regions and non-skin pigmentation regions, and detecting edges in the image to classify each part of image as an edge section or a non-edge section. The regions located in the skin pigmentation regions, made up of pixels classified as the non-edge sections, and surrounded by pixels classified as the edge sections are extracted as face candidate regions. Face regions are then detected according to a judgment as to whether the extracted face candidate regions are the regions correspond to human faces. Alternatively, it is also possible that the face regions are detected using a method disclosed in Japanese Patent Application Publication No. 2003-209683 or in Japanese Patent Application Publication No. 2002-199221.

Only the G (green) pixel components of the image data digitized by the A/D converter 102b are extracted through a high pass filter (HPF) (not shown). The extracted G pixel components are subjected to multiplication processing in a multiplication processing unit (not shown), and the result is sent to an AF (autofocus) evaluation value determination unit 109.

The AF evaluation value determination unit 109 defines an evaluation value calculation area in accordance with the face region detected by the face detection unit 20, calculates an average value of multiplication values in the evaluation value calculation area from the corresponding values among the full screen of G pixel component multiplication values sent from the multiplication processing unit, and uses the calculated average value as an AF evaluation value. The AF evaluation values are calculated at predetermined time intervals, and the value stored in the memory is updated upon each calculation. The way of defining the evaluation value calculation area is described later.

The CPU 112 determines the focusing state with respect to the subject according to the AF evaluation value calculated by the AF evaluation value determination unit 109. The determination method may be freely selected. For example, a method in which it is determined whether the AF evaluation value is near a maximum point may be used. In this case it is determined that the image capturing apparatus is focused on the subject when the AF evaluation value is approximately at the maximum and not focused otherwise. Alternatively, it is also possible to determine that the image capturing apparatus is focused on the subject when the AF evaluation value exceeds a predetermined threshold value.

The AF evaluation value determination unit 109 executes sequential amplitude calculations as the CPU 112 controls the motor driver 111 to move the focus position of the lens 14 in a movable range between an infinity-side end point (INF point) and a near-side end point (NEAR point), and transmits a determination value to the CPU 112 when the a maximum amplitude is detected.

In reception of the determination value, the CPU 112 issues the motor driver 111 with a command to cause the focus position of the lens 14 to move to the position at which the maximum amplitude has been detected. The motor driver 111 moves the focus position of the lens 14 to the focus position in accordance with the command from the CPU 112. These operations are generally called the autofocus (AF) operation.

Figure 2A:
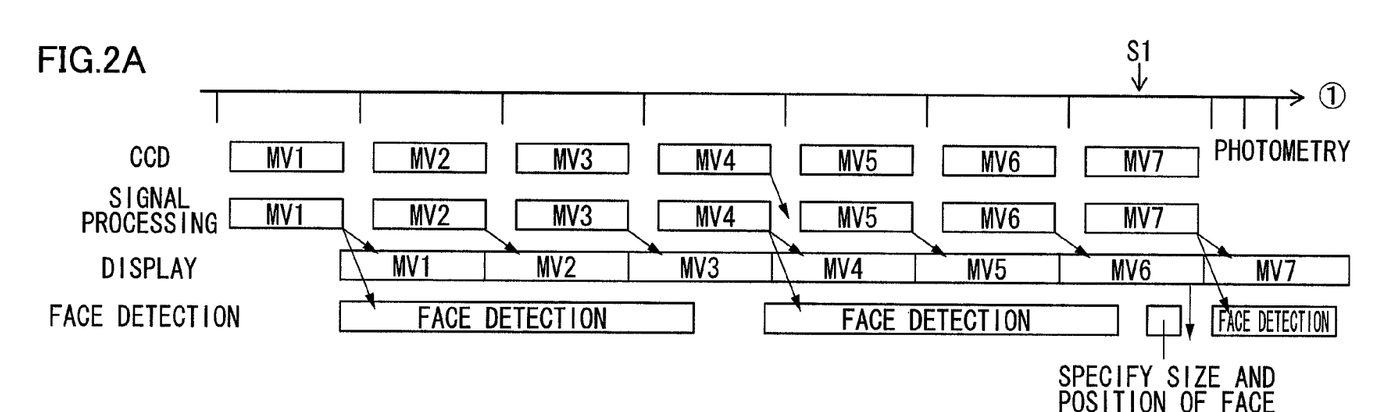
FIGS. 2A and 2B are sequence diagrams for face detection according to the first embodiment.
Figure 2B:
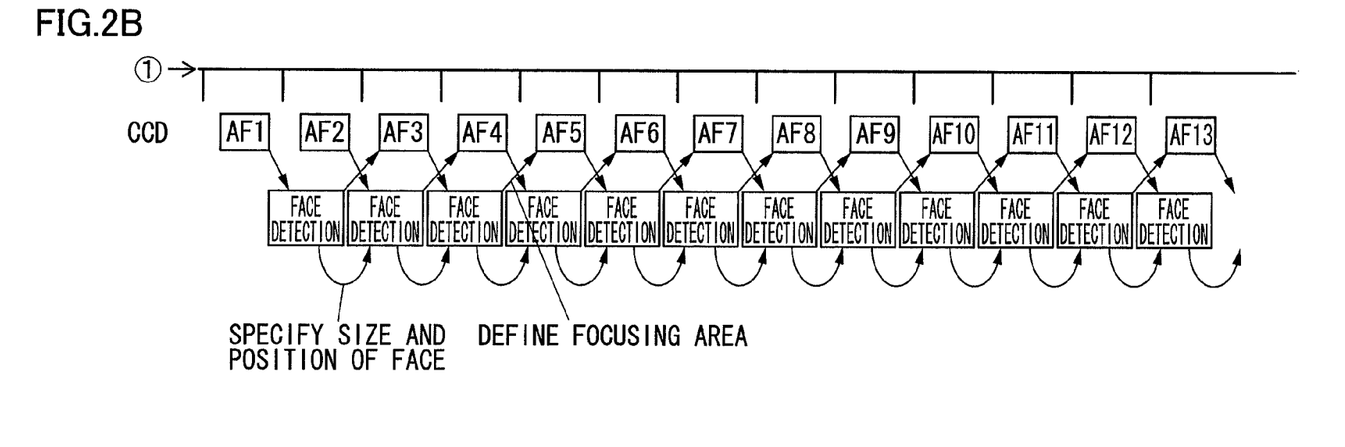

FIGS. 2A and 2B show an AF operation sequence of the present embodiment.

First, when the CCD 102a begins to continuously supply frame images (through-images), MV1, MV2, . . . , in accordance with the imaging mode setting, the imaging circuit 108 performs image processing on the through-images sequentially supplied from the CCD 102a. The processed through-images are temporarily stored in the VRAM, converted to a predetermined video signal format (such as an NTSC format color composite video signal) and sequentially supplied to the display system (not shown).

When the release switch being half-pressed (i.e., a first switch S1 being turned on) is detected, the face detection unit 20 attempts to detect faces in the through-images supplied from the imaging circuit 108. This allows detection of a region where a face is present in the image (a face region).

The AF evaluation value determination unit 109 defines a face region detection area for the next supplied through-image in accordance with the position of the face region having been detected. The AF evaluation value determination unit 109 simultaneously sets the size of the face region to be detected in the next supplied through-image to a size obtained by reducing the detected face region using a predetermined reduction ratio. The AF evaluation value determination unit 109 then detects a face region of the set size in the face region detection area defined in the next supplied through-image. Thus, a so-called full region search is unnecessary, and the face region detection area and the size of the face region become more limited each round of face detection.

Figure 3A:
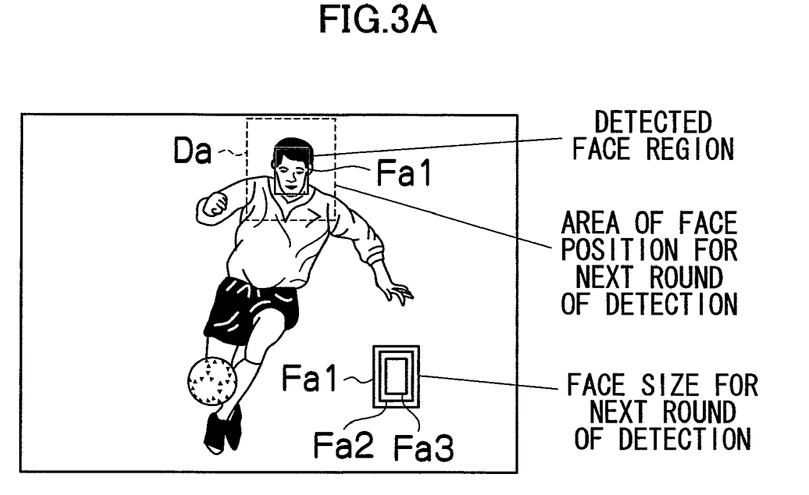
FIGS. 3A and 3B show examples of the face detection regions and face region sizes in subsequent through-images, as determined from results of face region detection in current through-images.
Figure 3B:
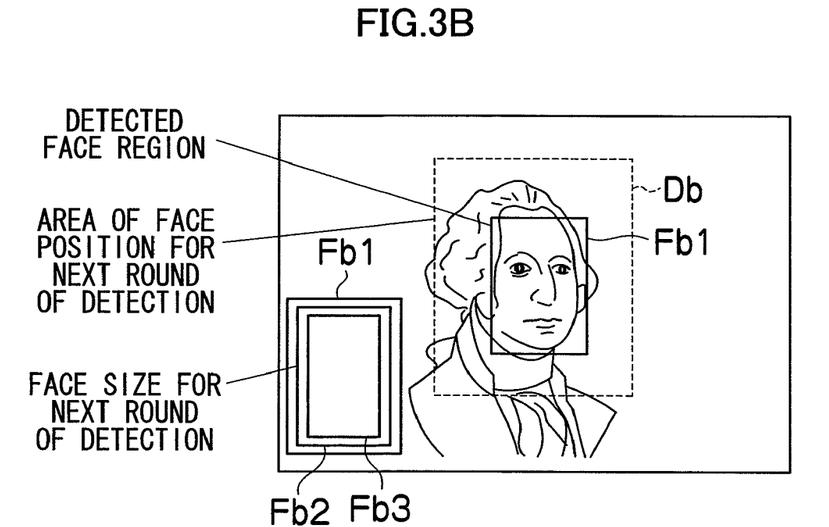

Assume, for instance, that a face region Fa1 of the default size of the face region detection area shown in FIG. 3A or a face region Fb1 of the default size of the face region detection area shown in FIG. 3B has been detected at a position approximately corresponding to the face of the subject.

In this case, for the rectangular face region Fa1 shown in FIG. 3A, the face region detection area in the next through-image is defined as a rectangular region Da of predetermined size with the central coordinates which are the same as those of the face region Fa1. For the rectangular face region Fb1 shown in FIG. 3B, meanwhile, the face region detection area in the next through-image is defined as a rectangular region Db of predetermined size with the central coordinates which are the same as those of the face region Fb1.

The face region detection area in the next supplied through-image may be freely selected. In FIGS. 3A and 3B, the sizes of the rectangular regions Da and Db are set to be four times the sizes of the face regions Fa1 and Fb1, respectively.

Moreover, when the face regions Fa1 and Fb1 of the sizes of the face region detection areas shown in FIGS. 3A and 3B have been detected, the sizes of the face regions Fa2 and Fb2 reduced in comparison to Fa1 and Fb1 by a predetermined scaling ratio (e.g., 0.8 times) are set to face detection sizes in the next supplied through-images.

The face region detection area for the next through-image is preferably defined so that any movement of the subject's face region in the time lag between supply of the through-image and completion of the face detection is covered.

It is possible that a subject movement vector is calculated for the face region currently detected. In this case, a rectangular region shifted in accordance with the calculated movement vector is defined as the face region detection area in the next through-image. Thus, the face region detection area in the next through-image can be defined in a way that takes into account the position and movement of the subject.

The smaller the face region detection area, however, the faster the face detection in the next through-image. Hence, the face detection AF of the present embodiment has particular advantages in terms of accuracy when the subject does not move sharply in the two frame time lag and the face region detection area can be set to a small size.

For simplicity, it is assumed that the above-described range of movement of the face region during the time lag is within the face region detection area for the next supplied through-image.

From this point onwards, the definement and reduction in the face region detection area in the next through-image is repeated every time a new through-image is supplied. When the face region Fa1 is detected in a given through-image as shown in FIG. 3A, the sizes of detected face regions in subsequent through-images become the progressively smaller Fa2, Fa3, and so on. When the face region Fb1 is detected in a given through-image as shown in FIG. 3B, the sizes of detected face regions in subsequent through-images become the progressively smaller Fb2, Fb3, and so on.

In this case, the face detection unit 20 attempts to detect the limited face region in the sequentially defined face region detection area. Since this involves detection, over a limited range, of a face region whose size has been limited for efficiency, it is possible to greatly reduce the time lag between supply of the through-image and completion of the face detection and thereby achieve fast face detection (see FIG. 2B).

The AF evaluation value determination unit 109 searches for the peak AF evaluation values for the detected face regions of sequentially reduced sizes in each subsequent through-image after the face detection, and focuses in on the face.

In the present embodiment, it is possible to focus in (face detection AF) on a through-image AF(n+2) in accordance with the face regions detected from a through-image AF(n) (n=1, 2, . . . ). This, it should be noted, improves the accuracy of focusing in on a face compared with the method in the related art.

As shown in FIG. 2A, in the face detection before the first switch S1 is turned on, there is a time lag (of three frames) corresponding to the time needed between the face detection unit 20 receiving a through-image from the imaging circuit 108 and the completion of face detection for the same through-image. For instance, when the face detection unit 20 has completed face detection on "MV1", the supply of "MV4" from the imaging circuit 108 has already begun. In the face detection in the related art, since the face region detected for "MV1" is used for face detection AF in "MV4" three frames later, the focusing in on the face cannot be said to be accurate.

In the face detection of the present embodiment shown in FIG. 2B, on the other hand, at the point when, for instance, the face detection for the through-image "AF1" is completed by the face detection unit 20, the supply of "AF3" from the imaging circuit 108 is still incomplete. Therefore, the detected face region for "AF1" can be used for focusing in on "AF3" two frames later. Since the time lag between face detection and focusing in is reduced in comparison to the face detection AF in the related art, the focusing in on the face is more accurate.

In the present embodiment, it is possible to shorten the time lag between the face detection and the focusing in as described above. Hereinafter in the second embodiment, however, a method for completely eliminating the time lag is described.

Second Embodiment

Figure 4:
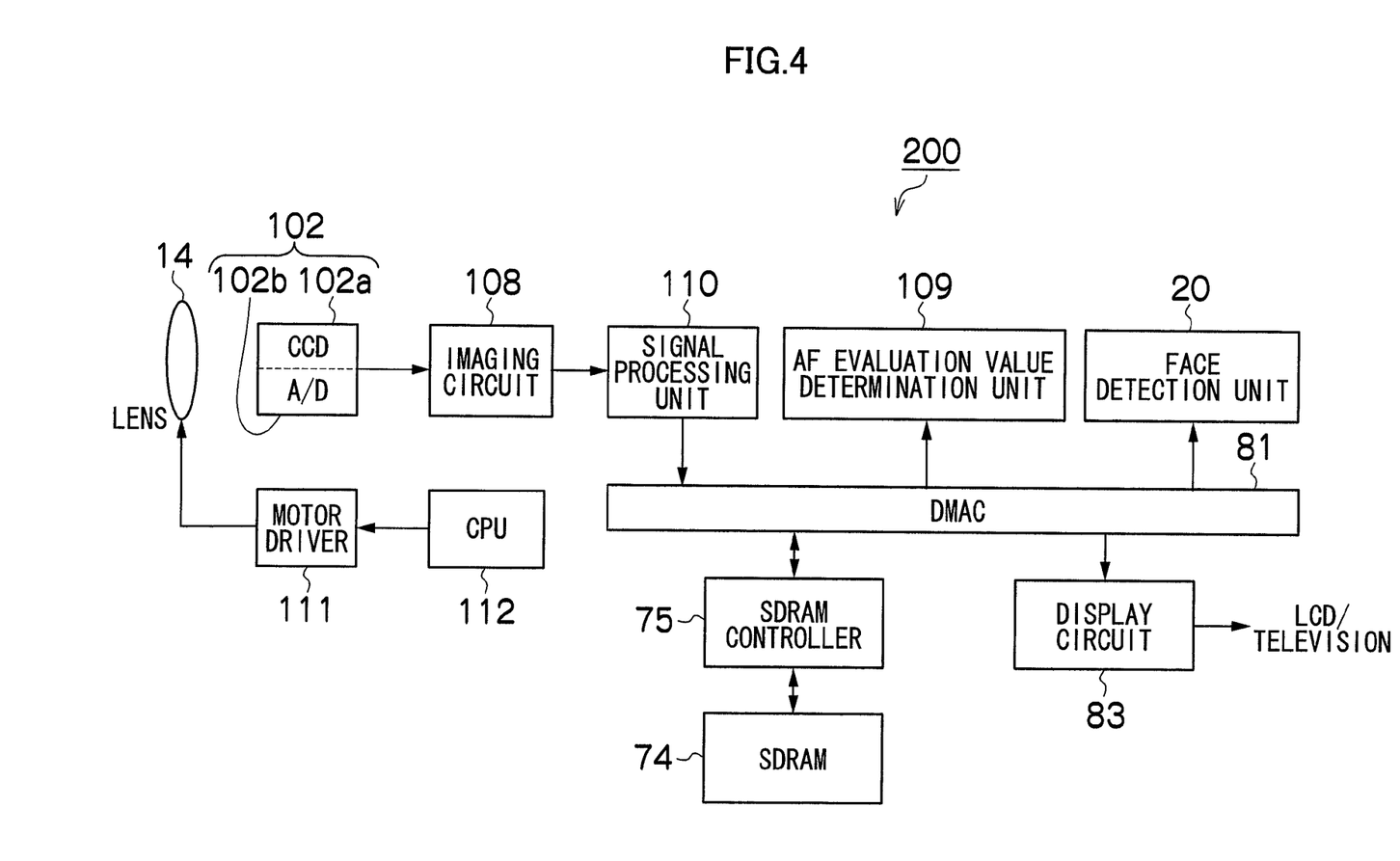
FIG. 4 is a block diagram of a camera according to a second embodiment of the present invention.

FIG. 4 is a block diagram of a camera 200 according to the second embodiment of the present invention. The camera 200 has the same elements described with the camera 100 of the first embodiment, and further includes an SDRAM controller 75, an SDRAM 74, a DMAC (direct memory access controller) 81, a display circuit 83, and a signal processing unit 110.

The signal processing unit 110 converts the CCD-RAW image data inputted from the imaging circuit 108 to a YC signal. The DMAC 81 then sends the obtained YC signal to the SDRAM controller 75, which writes the YC signal to the SDRAM 74. The DMAC 81 further sends the YC signal read from the SDRAM 74 by the SDRAM controller 75 to the display circuit 83, the AF evaluation value determination unit 109, and the face detection unit 20.

The YC signal sent to the display circuit 83 from the SDRAM 74 through the DMAC 81 is converted to a predetermined format signal (such as an NTSC format color composite video signal) for display by the display circuit 83 and outputted to a display device such as an LCD or a television. This allows video output of the images captured by the CCD 102a.

Figure 5A:
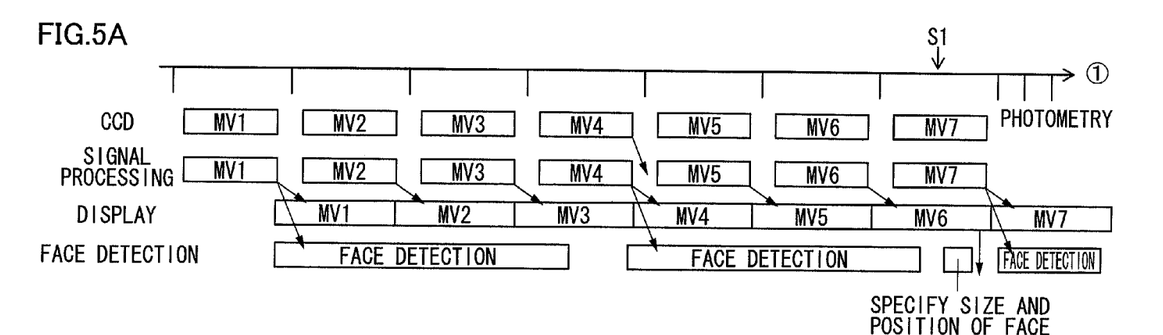
FIGS. 5A and 5B are sequence diagrams for face detection and AF evaluation value calculation of the second embodiment.
Figure 5B:
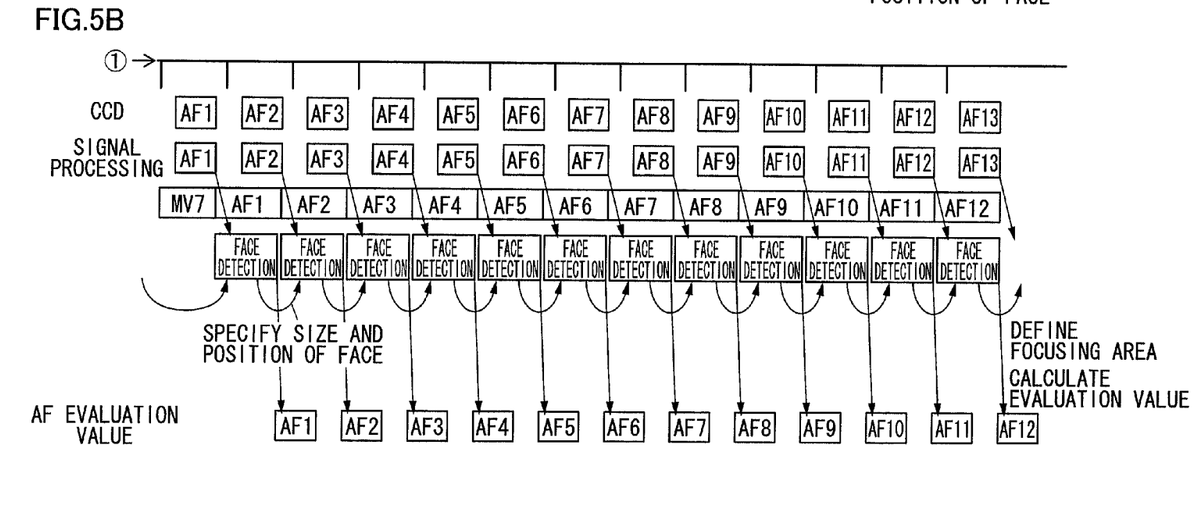

FIGS. 5A and 5B show an AF operation sequence of the present embodiment.

Like FIG. 2A, FIG. 5A shows the through-image output, display, and face detection before the first switch S1 is turned on.

FIG. 5B shows the through-image output, display, and face detection after the first switch S1 is turned on.

The DMAC 81 sequentially transfers the through-images continuously read from the SDRAM 74 to the face detection unit 20. On receiving the through-images through the DMAC 81, the face detection unit 20 detects the face detection, and sets the face region detection area and the size for the next through-image in the same way as in the first embodiment.

The DMAC 81 transfers the through-image, which is the same to be subjected to face detection by the face detection unit 20, also to the AF evaluation value determination unit 109.

For the through-image received from the DMAC 81, the AF evaluation value determination unit 109 sets the face region detected by the face detection unit 20 as the evaluation value calculation area, calculates the corresponding AF evaluation value from the area, and searches for the focus position.

In the first embodiment, the face detection is performed on the through-image AF(n) and the setting of the evaluation value calculation region is performed on the through-image AF(n+2). The present embodiment, however, differs from the first embodiment in that the through-image on which the evaluation value calculation area is defined matches the through-image on which the face detection is performed. Hence, if the detected face region is used without alteration as the evaluation value calculation area, it is possible to accurately focus in on the face.

Third Embodiment

The camera 100 of the first embodiment has a simple circuit construction and therefore the advantage of low power consumption. On the other hand, the camera 200 of the second embodiment has higher power consumption but the advantage of the focusing on the face being more accurate. The third embodiment provides a camera which has both of these advantages.

Figure 6:
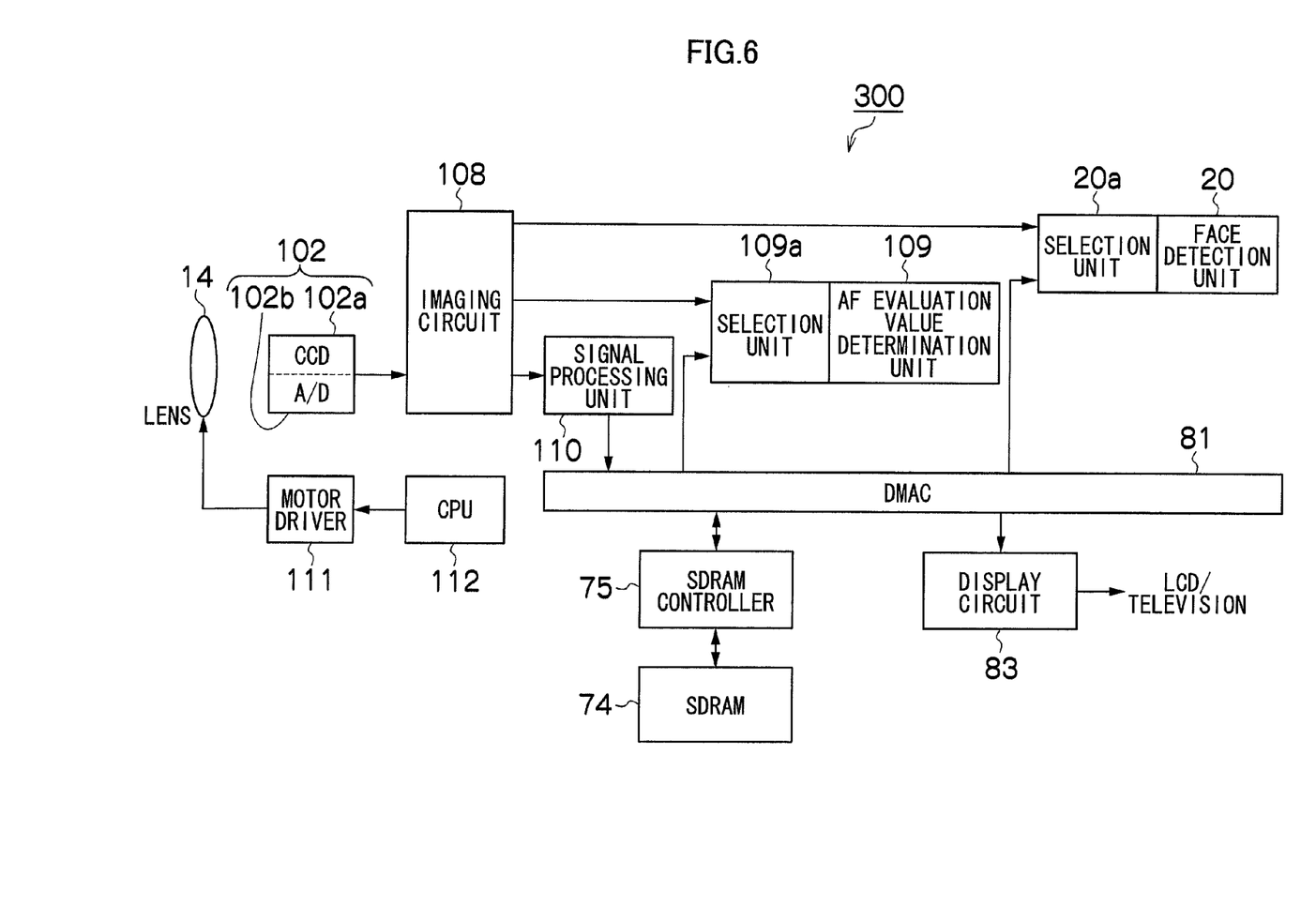
FIG. 6 is a block diagram of a camera according to a third embodiment of the present invention.

FIG. 6 is a block diagram of a camera 300 according to the third embodiment of the present embodiment. This construction partially resembles the constructions of the first and second embodiments, but differs in that the face detection unit 20 includes a selection unit 20a, and the AF evaluation value determination unit 109 includes a selection unit 109a.

The selection unit 20a functions to select one of the imaging circuit 108 and the SDRAM 74 as the supply source of the through-images to the face detection unit 20. When the selection unit 20a selects the imaging circuit 108 as the supply source of the through-images, the face detection unit 20 performs face detection on the through-images received from the imaging circuit 108 in the same way as in the first embodiment. When the selection unit 20a selects the SDRAM 74 as the supply source of the through-images, the face detection unit 20 performs face detection on the through-images received from the SDRAM 74 through the DMAC 81 in the same way as in the second embodiment.

The selection unit 109a, on the other hand, functions to select one of the imaging circuit 108 and the SDRAM 74 as the supply source of the through-images to the AF evaluation value determination unit 109. When the selection unit 109a selects the imaging circuit 108 as the supply source of the through-images, the AF evaluation value determination unit 109 calculates AF evaluation values from the through-images received from the imaging circuit 108 in the same way as in the first embodiment. When the selection unit 109a selects the SDRAM 74 as the supply source of the through-images, the AF evaluation value determination unit 109 calculates AF evaluation values from the through-images received from the SDRAM 74 through the DMAC 81 in the same way as in the second embodiment.

The selections of the through-image supply source by the selection unit 20a and the selection unit 109a are controlled by the CPU 112.

First, the CPU 112 causes the selection unit 20a to select the imaging circuit 108 as the supply source of the through-images.

When the first switch S1 is turned on, the face detection unit 20 performs face detection on the through-image received from the imaging circuit 108 and sets the position and size of the face region detection area on the next through-image.

The CPU 112 compares the position and size of the face region detected in the last round of detection by the face detection unit 20 with the position and size of the face region detected in the current round of detection, and judges whether any amount of change in the positions and sizes of the face regions is less than a predetermined threshold (whether, for instance, the distance between the central coordinates of the face regions is less than half the length of the diagonal of preceding face region and whether the size ratio is less than 10%).

When judging that the amount of change in the positions and sizes of the face regions is less than the predetermined threshold, the CPU 112 causes the selection unit 20a to select the imaging circuit 108 and the selection unit 109a to select the imaging circuit 108 as the supply source of the through-images. The search for focus position is then performed in the same way as in the first embodiment. This arrangement is used because when the amount of change in the positions and sizes of the face regions is small, the face detection AF of the first embodiment is considered to be sufficiently accurate. Since, with this arrangement, the supply of the through-images to the AF evaluation value determination unit 109 from the SDRAM 74 can be omitted, and wasteful consumption of electrical power can be reduced.

On the other hand, when judging that the amount of change in the positions and sizes of the face regions is not less than the predetermined threshold, the CPU 112 causes the selection unit 20a to select the SDRAM 74 and the selection unit 109a to select the SDRAM 74 as the supply source of the through-images. The search for focus position is then performed in the same way as in the second embodiment. This arrangement is used because when the amount of change in the positions of the face regions is large, the face detection AF of the second embodiment is necessary to ensure accuracy.

The above-described judgment of the amount of change in the positions and sizes of the face regions and the selection of the through-image supply source are then repeated until the release switch is fully pressed (the second switch S2 is turned on).

Thus, by changing the through-image supply source of the face detection unit 20 and the AF evaluation value determination unit 109 according to the amount of change in the positions and sizes of the face regions, it is possible to maintain a balance between reduction in power consumption and accuracy of the face detection AF.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image capturing apparatus, comprising:
 a taking optical system which includes a focusing lens;
 an imaging unit which receives a subject light through the taking optical system and converts the subject light to image data representing frame images;
 a temporary storage unit which temporarily stores the frame images sequentially supplied by the imaging unit;
 a face detection frame image supply source selecting unit which selects one of the temporary storage unit and the imaging unit as a face detection frame image supply source to supply the frame images for performing face detection;
 a face detection unit which detects a face region of a person in a first frame image supplied by the face detection frame image supply source;
 a face detection setting unit which sets a detection range and size of a face region in a second frame image supplied after the first frame image, in accordance with a position of the face region detected by the face detection unit in the first frame image;
 a focus frame image supply source selecting unit which selects one of the temporary storage unit and the imaging unit as a focus frame image supply source to supply the frame images for defining a focus evaluation value calculation region;
 a control unit which compares a position and a size of the face region detected by the face detection unit in the first frame image with a position and a size of the face region detected by the face detection unit in the second frame image, judges whether an amount of change in the positions and the sizes of the face regions is less than a predetermined threshold, and causes the face detection frame image supply source selecting unit and the focus frame image supply source selecting unit to select the imaging unit as the face detection frame image supply source and the focus frame image supply source when judging that the amount of change is less than the predetermined threshold and to select the temporary storage unit as the face detection frame image supply source and the focus frame image supply source when judging that the amount of change is not less than the predetermined threshold;
 a focus region defining unit which defines, in accordance with a position and a size of the face region detected by the face detecting unit in the second frame image, the focus evaluation value calculation region in a third frame image supplied by the focus frame image supply source;
 a calculation unit which calculates a focus evaluation value in accordance with the image data in the focus evaluation value calculation region defined by the focus region defining unit in the third frame image; and
 a focus adjustment unit which adjusts a focus of the focusing lens in accordance with the focus evaluation value calculated by the calculation unit.

2. A focusing method of an image capturing apparatus comprising a taking optical system which includes a focusing lens, an imaging unit which receives a subject light through the taking optical system and converts the subject light to image data representing frame images, the method comprising the steps of:
 storing the frame images sequentially supplied by the imaging unit in a temporary storage unit;
 selecting one of the temporary storage unit and the imaging unit as a face detection frame image supply source to supply the frame images for performing face detection;
 detecting a face region of a person in a first frame image supplied by the face detection frame image supply source;
 setting a position and a size of a face region detection area in a second frame image supplied after the first frame image, in accordance with a position of the face region detected in the first frame image;
 selecting one of the temporary storage unit and the imaging unit as a focus frame image supply source to supply the frame images for defining a focus evaluation value calculation region;
 comparing a position and a size of the face region detected in the first frame image with a position and a size of the face region detected in the second frame image, judging whether an amount of change in the positions and the sizes of the face regions is less than a predetermined threshold, selecting the imaging unit as the face detection frame image supply source and the focus frame image supply source when judging that the amount of change is less than the predetermined threshold, and selecting the temporary storage unit as the face detection frame image supply source and the focus frame image supply source when judging that the amount of change is not less than the predetermined threshold;

defining, in accordance with a position and a size of the face region detected in the second frame image, the focus evaluation value calculation region in a third frame image supplied by the focus frame image supply source;

calculating a focus evaluation value in accordance with the image data in the focus evaluation value calculation region defined in the third frame image; and adjusting a focus of the focusing lens in accordance with the calculated focus evaluation value.

* * * * *